United States Patent [19]

Laessle et al.

[11] Patent Number: 4,871,296
[45] Date of Patent: Oct. 3, 1989

[54] DECOUPLER SHAFT AND AIR TURBINE STARTER HAVING SUCH A DECOUPLER

[75] Inventors: David L. Laessle, Phoenix; Todd S. Carlson, Chandler; Andrew J. Krochmalny; Leroy C. Anderson, both of Tempe, all of Ariz.

[73] Assignee: Allied-Signal Inc., Phoenix, Ariz.

[21] Appl. No.: 268,311

[22] Filed: Nov. 7, 1988

[51] Int. Cl.$^4$ ............................................. F01D 15/12
[52] U.S. Cl. .................................. 415/123; 60/39.142; 192/56 R; 74/7 C; 403/32
[58] Field of Search ............ 415/122 R, 123, 18; 60/39.142; 464/39, 38; 192/56 R; 74/7 C; 403/32

[56] References Cited

U.S. PATENT DOCUMENTS

| | | | |
|---|---|---|---|
| 504,479 | 9/1893 | Ross | 192/56 R |
| 2,174,342 | 9/1939 | Greulich | 464/39 |
| 2,291,407 | 7/1942 | Paul | 464/39 |
| 2,983,122 | 5/1961 | Polzin | 464/39 |
| 3,521,505 | 7/1970 | Sebring | 60/39.142 |
| 4,257,147 | 3/1981 | Moss | 192/56 R |
| 4,385,894 | 5/1983 | Sharpe et al. | 464/31 |
| 4,768,634 | 9/1988 | Quick et al. | 192/56 R |

FOREIGN PATENT DOCUMENTS

| | | | |
|---|---|---|---|
| 55454 | 6/1952 | France | 464/39 |
| 1283451 | 1/1987 | U.S.S.R. | 192/56 R |

Primary Examiner—Robert E. Garrett
Assistant Examiner—John T. Kwon
Attorney, Agent, or Firm—Terry L. Miller; James W. McFarland

[57] ABSTRACT

A torque limiting decoupler shaft transmits driving torque in a first sense without torque limiting action. However, torque applied to the shaft in a reverse sense opposite the driving torque results in an axial separating force between two portions of the decoupler shaft. When the reverse torque reaches a certain level a frangible tensile bar member fractures to permit decoupling of the shaft portions. A component of the shaft prevents undesirable recoupling of the shaft portions while also insuring that the relatively rotating portions of the shaft do not flail. An air turbine starter includes such a decoupler shaft.

20 Claims, 2 Drawing Sheets

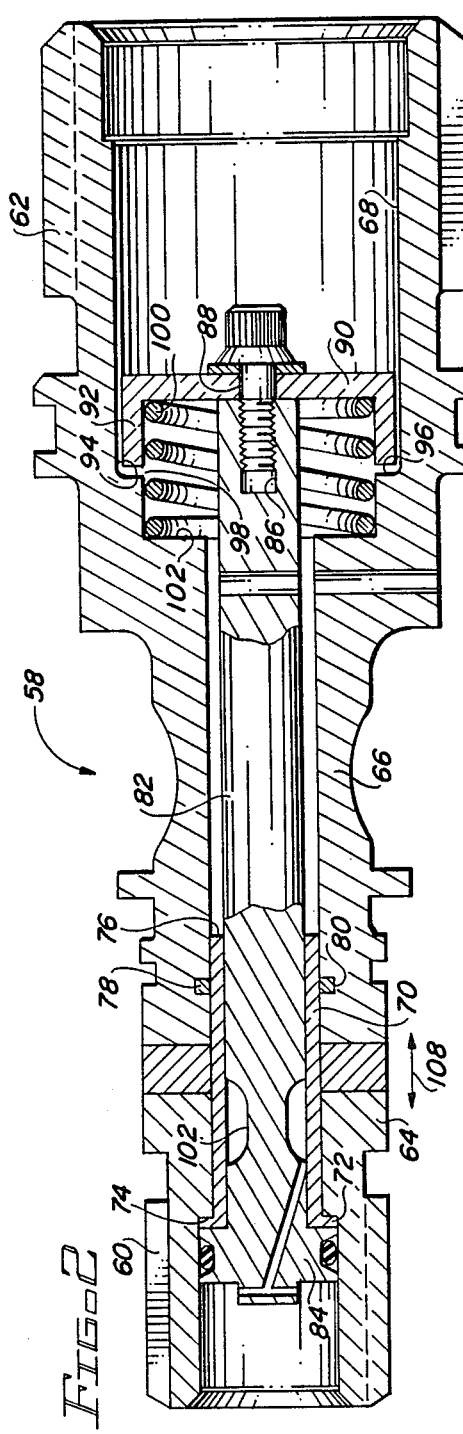
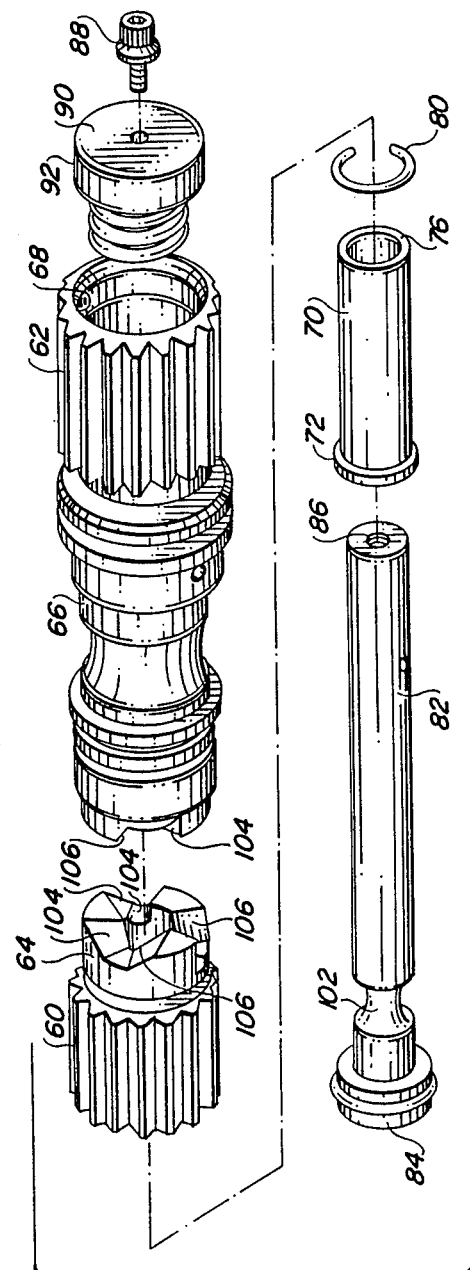

DECOUPLER SHAFT AND AIR TURBINE STARTER HAVING SUCH A DECOUPLER

TECHNICAL FIELD

The field of the present invention is that of decoupler devices capable of driving in one direction only, and decoupling in response to a torque load in the opposite direction. More particularly, the present invention is in the field of air turbine starters having a decoupling device of the character described above.

BACKGROUND ART

Air turbine starters are known in the aviation field, and are commonly used to start propulsion turbine engines of modern aircraft. A persistent problem with high speed sprag-type overrunning clutches of the type used in air turbine starters is wear to the clutch caused by overrunning of the clutch in operation. Such overrunning occurs continuously during operation of a turbine engine, and particularly results in wear of the sprag members of the clutch. Consequently, one or more of the worn sprags may be forced over center during torque transmission through the clutch. Once over center, these sprags will possibly cause the clutch to transmit torque in the direction which should result in overrunning of the clutch. Were the clutch allowed to transmit reverse torque instead of overrunning, the turbine engine would drive the air turbine starter to a high and destructive speed. In order to prevent such destructive back driving of the air turbine starter by the turbine engine, a decoupler mechanism is conventionally provided in the power train between the starter and engine.

Unfortunately all presently known decoupler devices suffer from one or more of several shortcomings. That is, the conventional decoupler mechanisms may be overly large or complex in their construction, they may not be reliable in their operation, some may undesirably reset automatically to a torque transmitting condition after they are tripped by a reverse torque, others may require extensive time consuming disassembly to reset after being tripped by a reverse torque incident.

In view of the above, it is recognized in the pertinent art that an improved decoupler device is needed for use with air turbine starters. The decoupler device should be comparatively small, simple, inexpensive, and rugged in its construction, it should be precise and reliable in its operation, it should not undesirably reengage after being tripped, and it should not require extensive or time consuming effort to reset the device after it is tripped by a reverse torque incident.

DISCLOSURE OF THE INVENTION

In view of the above, the present invention provides a decoupler shaft wherein first and second axially adjacent shaft portions cooperatively define interengaging driving and ramp surfaces. The driving surfaces transmit torque in a first sense between the shaft portions substantially without a resultant axial force between the shaft portions. On the other hand, reverse torque in a second sense opposite the driving torque results in generation of an axial separating force between the shaft portions by virtue of the cooperative ramp surfaces. This axial separating force is resisted only by a frangible tensile bar member extending between the two shaft portions. Should the reverse torque reach a predetermined level, the tensile bar member fractures to allow axial separation and decoupling of the shaft portions from one another. Once decoupled, the shaft portions are relatively rotatable to prevent transmission of both driving and reverse torque via the decoupler shaft. A dual function structure is provided which on the one hand provides a bearing surface for allowing relative rotation of the shaft portions without allowing them to flail, while on the other hand also positively preventing reengagement of the shaft portions.

The present invention also provides an air turbine starter including a decoupler shaft of the above-described character. The air turbine starter disposes the decoupler shaft in an easily accessible location such that removal thereof and resetting of the decoupler shaft does not require disassembly of the air turbine starter.

Resetting of the decoupler shaft, that is, restoring it to a condition for use as a torque transmitting shaft with a determined reverse torque decoupling function, involves returning the shaft portions axially to their interengaged relative position, and replacement of the fractured tensile bar member with a new intact tensile bar member.

An advantage of the present invention is the crisp, reliable, and highly repeatable decoupling action which is provided by fracture of the tensile bar member. That is, once the determined reverse torque level is imposed upon the decoupler shaft, decoupling action is very rapid, and without a delayed or slowed break away which could result in damage to the air turbine starter.

Other advantages of the present decoupler shaft are its small size, relatively simple and rugged construction which result in a comparatively low cost of manufacture, and the ease with which a tripped decoupler shaft can be restored to service condition by replacement of the tensile bar member. No special tools are required for this replacement, and the tensile bar member is itself a relatively inexpensive consumable component part.

Additional objects and advantages of the present invention will be apparent from the reading of the following detailed description of a single preferred embodiment thereof taken in conjunction with the appended drawing figures of which:

BRIEF DESCRIPTION OF THE DRAWINGS

FIG. 2 depicts an enlarged fragmentary cross sectional view of a selected decoupler shaft portion of the air turbine starter depicted more fully in FIG. 1: and FIG. 3 presents an exploded perspective view of selected parts of the decoupler shaft of the present invention.

BEST MODE FOR CARRYING OUT THE INVENTION

Figure 1:
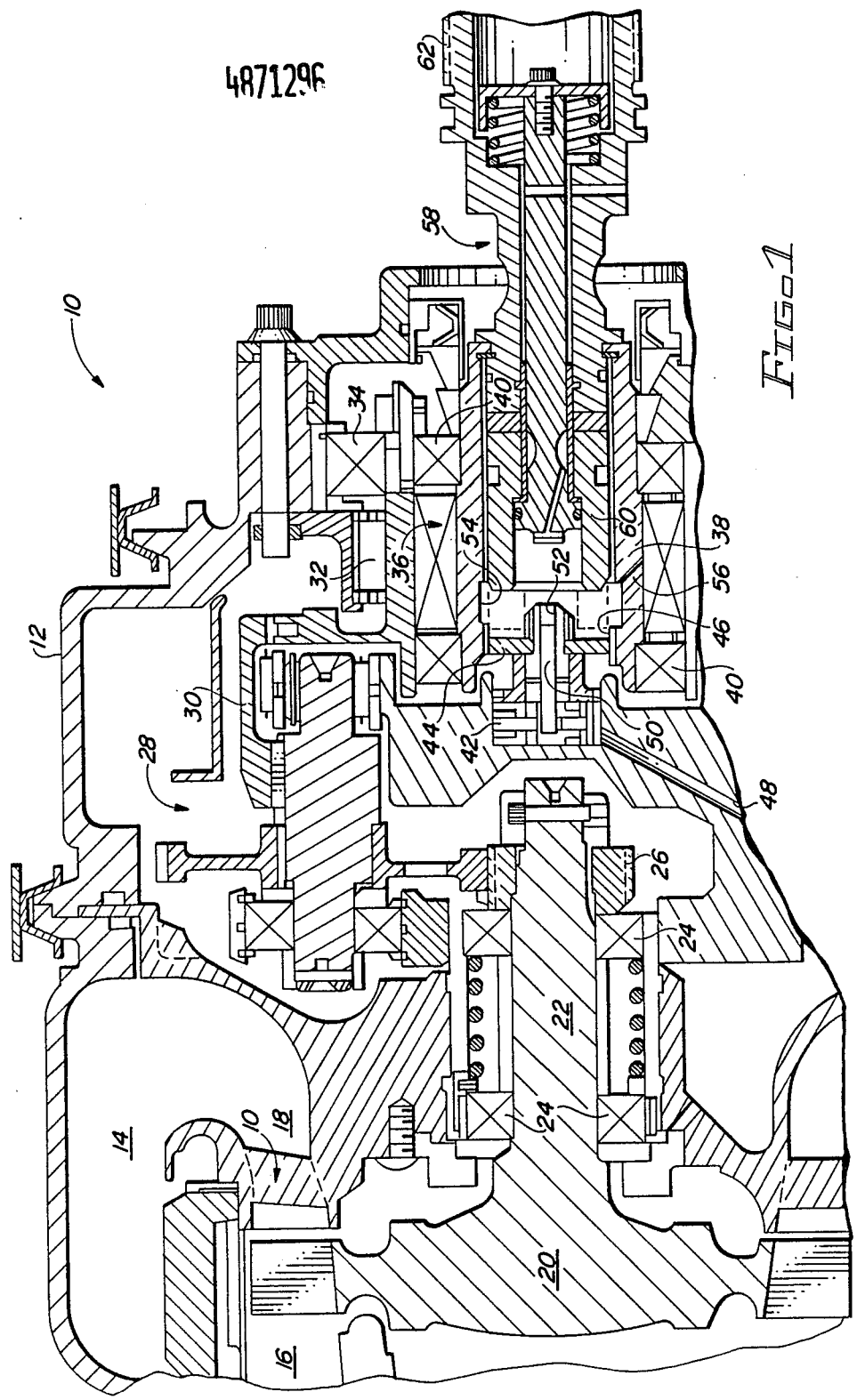
FIG. 1 presents a fragmentary partially cross sectional view of an air turbine starter embodying the present invention.

FIG. 1 depicts an air turbine starter (10) embodying the present invention. The air turbine starter (10) includes a housing (12) defining an inlet (14) (only a portion of which is depicted viewing FIG. 1) and an outlet (16). The housing (12) defines a flow path (18) extending between the inlet (14) and the outlet (16). An axial flow turbine member (20) is rotatably journaled by the housing (12) in the flow path (18) for extracting mechanical energy from a flow of pressurized fluid conducted between the inlet (14) and the outlet (16) via the flow path (18). The turbine member (20) is carried by a rotatable shaft (22) journaled by bearings (24) carried by the housing (12). Secured to the shaft member (22) is a gear member (26) engaging a speed-reducing gear train generally referenced with the numeral (28). The gear train (28) includes a gear portion (30) of an output member (32) which is also journaled by the housing (12) by a bearing member (34) carried thereby. The output member (32) drivingly connects with a sprag clutch of the inner-race-overrunning type generally referenced with the numeral (36), which in turn drivingly connects with a tubular output shaft (38). The output shaft (38) is rotatably carried by the output member (32) via bearing members (40)

A small oil pump (42) is carried by the housing (12) concentrically with the output shaft (38). Pump (42) is drivingly connected with output shaft (38) via a splined drive disk (44) at its outer perimeter engaging drivingly with a spline surface portion (46) of shaft (38). Lubricating oil from a sump portion (not shown) of housing (12) is admitted to pump (42) via a passage (48) defined by housing (12). The pump (42) discharges oil therefrom via a central axially extending passage (50) opening at (52) within the output shaft (38). Within shaft (38) a circumferentially extending groove (54) is radially disposed outwardly of the opening (52) to define a basin for receiving the oil from pump (42). A radially extending passage (56) extends outwardly from the groove (54) to the clutch (36) to supply oil thereto.

Carried by the tubular output shaft (38) is a decoupler shaft assembly generally referenced with the numeral (58). Decoupler shaft (58) drivingly connects with output shaft (38) via respective interengaging male and female spline surfaces generally indicated at (60). The decoupler shaft (58) also defines a male spline surface (62) by which the air turbine starter (10) couples in driving relation with a combustion turbine engine (not shown).

Viewing now FIGS. 2 and 3 in conjunction, it will be seen that the decoupler shaft assembly (58) includes a first axial portion (64) and a second axially adjacent axial portion (66). The portion (64) defines the male spline surface (60) which couples with output shaft (38), while the portion (66) defines spline surface (62). The portions (64) and (66) cooperatively define a stepped axial through bore (68). That is, each of the portions (64) and (66) defines a respective part of the through bore (68).

Disposed within bore (68) and extending between portions (64) and (66), is an elongate tubular guide sleeve member (70) formed of material having favorable bearing qualities. For example, the sleeve (70) may be formed of brass or bronze. Sleeve (70) defines a flange portion (72) engaging a step (74) on bore (68) within portion (64), and an end edge (76) in a first position disposed rightwardly (viewing FIG. 2) of a groove (78) defined on the bore (68) within portion (66). A radially resilient metal ring (80) is captured within the groove (78) outwardly of the sleeve (70).

Also received slidingly in the bore (68), and within sleeve member (70), is an elongate tensile bar member (82). The tensile bar member (82) at one end thereof defines a head portion (84) of larger diameter than the remainder thereof, and trapping the flange portion (72) of sleeve (70) against step (74) of bore (68). At the opposite end of tensile bar member (82), the latter defines an axially extended threaded bore (86) receiving a threaded fastener (88). An annular disk member (90) is carried upon the fastener (88) and defines an axially extending shoulder portion (92) having an axially disposed end face (94). The end face (94) of disk member (90) axially confronts in a first position thereof a step (96) on bore (68) to define an axial gap (98). A coil compression spring (100) extends between a step (102) on bore (68) and the disk member (90) to urge the tensile bar member (82) rightwardly in bore (68) (viewing FIG. 2). Consequently, the spring (100) insures that head portion (84) seats against flange (72) of the sleeve member (70), and that the gap (98) is ordinarily maintained. Thus, the portions (64) and (66) of decoupler shaft assembly (58) are biased axially together and are maintained in coaxial alignment by sleeve (70), while the tensile bar (82) is isolated from all axial stress except that caused by the relatively light preload of spring (100). It will be noted that tensile bar member (82) includes a portion (102) of reduced diameter, or neck-defining portion. The importance of this neck-defining portion (102) will be further described below.

Viewing particularly FIG. 3, it will be seen that the portions (64) and (66) each include matching interengageable radially extending driving and ramp surfaces, (104) and (106), respectively. As depicted, each of the driving surfaces (104), and each of the ramp surfaces (106) are circumferentially spaced apart. Each driving surface and each ramp surface of portion (64) is engageable with one of the correspondingly numbered surfaces of portion (66). The driving surfaces (104) each extend substantially axially so that opposing torques applied in respective first directions to the portions (64) and (66) and urging these surfaces into contact result in virtually no axial force being developed between the portions. On the other hand, the ramp surfaces (106) extend both axially and circumferentially so that opposing torques applied to the portions (64) and (66) in respective second directions opposite the first directions results in an axial force tending to axially separate the portions (64) and (66), as is depicted by arrow (108).

Having observed the structure of the air turbine starter (10), attention may now be given to its method of operation. During a normal start cycle of a combustion turbine engine with both the air turbine starter (110) and the engine being stationary, a supply of pressurized fluid is connected to the inlet of the air turbine starter (10), as is depicted by the fluid flow arrow (10). Viewing FIG. 1, it will be seen that a flow of pressurized fluid through the housing (12) via the flow path (18) will cause the turbine (20) to extract mechanical power therefrom and to deliver this power to the output member (32) via the gear train (28). The sprag clutch connects power from output member (32) to output shaft (38) while the latter drivingly connects with decoupler shaft portion (64). Engine starting torque applied to portion (64) urges surfaces (104) into engagement with each other so that decoupler shaft portion (66) conveys the engine starting power to the turbine engine substantially without axial force within the decoupler shaft (58). The air turbine starter (10) delivers mechanical power in this way to the decoupler shaft (58) thereof, and to the combustion turbine engine connected thereto to accelerate the latter towards its self-sustaining speed.

Upon the combustion turbine engine obtaining its self-sustaining speed, the shaft thereof will accelerate ahead of the output shaft (38) of the air turbine starter (10). Consequently, the torque loading within the sprag clutch (36) will be eliminated. Thus, shaft (38) overruns with respect to output member (32). Shortly after the turbine engine reaches self-sustaining speed, the supply of pressurized air to flow path (18) is shut off. As a result, the air turbine starter (10) coasts to a stop and remains stopped during operation of the turbine engine. The sprag clutch (36) continues overrunning as long as the engine operates. Oil pump (42) driven by shaft (38) continuously provides lubricating oil to clutch (36).

In the event of a physical failure in starter (10), for example, if one or more of the sprags of clutch (36) were to flip over center so that the turbine engine could back dive the starter (10) to a high and destructive speed, or alternatively, if one of the bearings (40) were to fail and seize so that a high resisting torque load were imposed on the turbine engine, the decoupler shaft (58) then functions to prevent further damage. Viewing FIGS. 2 and 3, it will be seen that reverse torque applied to portion (66) urges ramp surfaces (106) into engagement to result in an axial separating force (108) between the portions (64), (66). A relatively low reverse torque is sufficient to overcome the preload of spring (100) and to bring surfaces (94) and (96) into engagement eliminating gap (98). Thereafter, further increased reverse torque can be transmitted from portion (66) to portion (64) only with the development of a directly related tensile force imposed on tensile bar member (82). The neck portion (102) of tensile bar member (82) is sized so that the member will fail in tension at a predetermined stress level. That is, the tensile bar member (82) fractures at neck (102) when a predetermined level of reverse torque is imposed upon decoupler shaft (58).

As a result of the fracturing of tensile bar member (82) at neck (102), the portions (64) and (66) are allowed to rotate relative to one another in response to the reverse torque. Ramp surfaces (106) consequently move portion (64) leftwardly, viewing FIG. 1, to a position depicted in dashed lines. In this position, the surfaces (104) (106) are disengaged from one another. Leftward movement of portion (64) also causes the sleeve member (70) to move leftwardly relative to portion (66) so that the end edge (76) of sleeve (70) moves leftwardly of resilient ring (80). In this second position of the sleeve member (70), the ring (80) moves partially out of the groove (78) to block rightward movement of the sleeve member (70). Because the sleeve member (70) is fitted in bore (68) with an interference fit with portion (64), the latter cannot move rightwardly to once again engage the surfaces (104), (106). However, the sleeve member (70) is relatively rotatably received in the portion of bore (68) defined by decoupler shaft portion (66) so that the latter portion may rotate in output shaft (38) without excessive wear thereof. That is, the sleeve member (70) serves as a bearing to center the portion (66) and to protect the output shaft (38) from wear while the turbine engine continues to operate.

It will be easily appreciated that in conjunction with repair of the air turbine starter (10), the decoupler shaft assembly (58) may be removed from output shaft (38) so that a new tensile bar member (82) can be installed in the decoupler shaft latter. With replacement of the tensile bar member (82), the decoupler shaft assembly (58) may be reinstalled in the air turbine starter (10) for reuse to protect the starter against reverse torque.

While the present invention has been depicted and described by reference to one particular preferred embodiment thereof, no limitation upon the invention is implied by such reference, and no such limitation is to be inferred therefrom. The invention is intended to be limited only by the spirit and scope of the appended claims which provide further definition of the invention.

What is claimed is:

1. A decoupler shaft comprising: a first and a second axially adjacent elongate and coaxial shaft portions, each one of said shaft portions defining respective torque transmitting coupling means for inter-engaging with one of a respective driving mechanism and driven mechanism, said shaft portions also each defining respective driving surfaces and ramp surfaces interengaging in a first relative position of said shaft portions and both extending radially, said driving surfaces of said shaft portions extending substantially axially to transmit driving torque in a first sense between said shaft portions, said ramp surfaces extending both axially and circumferentially to transmit reverse torque in a second sense opposite said first sense with a resulting axial separating force between said shaft portions, a frangible tensile bar member extending between said shaft portions to retain the latter in said first relative position in opposition to said separating force, upon said reverse torque reaching a certain level said tensile bar fracturing to allow said separating force to relatively move said shaft portions to a second spaced apart relative position wherein said driving and ramp surfaces do not interengage.

2. The invention of claim 1 wherein said shaft portions cooperatively define a stepped axially extending through bore, said tensile bar member being received into said through bore.

3. The invention of claim 2 further including a sleeve member received in said through bore within both said shaft portions, said sleeve member relatively immovable securing to one of said shaft portions and relatively rotatively as well as axially slidably cooperating with the the other of said shaft portions, whereby said sleeve member serves to maintain said shaft portions substantially coaxial in said second relative position thereof.

4. The invention of claim 3 wherein said sleeve member defines an end edge disposed within said other shaft portion and spaced from said one shaft portion, said other shaft portion defining a circumferential radially outwardly extending groove on said through bore spaced axially between said sleeve member end edge and said one shaft portion in said first relative position of said shaft portions, a radially resilient ring member disposed in said groove and in said first relative position of said shaft portions being trapped therein to circumscribe said sleeve member, in said second relative position of said shaft portions said sleeve member end edge moving axially past said groove to free said ring member therefrom, said freed ring member moving partially from said groove into said bore to inhibit return of said shaft portions from said second position to said first position.

5. The invention of claim 2 wherein said frangible tensile bar member includes a pair of axially spaced apart and axially confronting abutment surfaces, a first of said pair of abutment surfaces of said tensile bar member engaging a step on said bore defined by said one shaft portion, a second of said pair of abutment surfaces confronting in said first position of said shaft portions a oppositely disposed step on said bore defined by the other of said shaft portions, said shaft portions moving axially apart from said first position toward said second position in response to said separating force to engage said second abutment surface with said oppositely disposed step to apply said separating force to said tensile bar member.

6. The invention of claim 5 further including resilient means for urging said second abutment surfaces away from said oppositely disposed step, thereby to urge said shaft portions to said first relative position.

7. The invention of claim 5 wherein said tensile bar member defines a comparatively smaller diameter neck defining portion, said tensile bar fracturing at said neck portion in response to a determined axial tensile force applied thereto via said abutment surfaces thereof.

8. An air turbine starter comprising a housing, said housing defining an inlet and outlet, and a first flow path extending between said inlet and said outlet for communicating a flow of pressurized motive gas therethrough; a turbine member journaled within said housing and disposed within said flow path for rotatably extracting mechanical power from said motive gas flow, speed reduction gear train means having a high speed gear member drivingly coupled with said turbine member and a comparatively low speed output member, one way overrunning clutch means coupling said output member with an output shaft while allowing overrunning of the latter said output shaft coupling with a decoupler shaft assembly, said decoupler shaft assembly including a pair of coaxial axially adjacent shaft portions, said shaft portions defining first cooperating engagement means for transmitting torque therebetween in a first sense substantially without resulting axial force between said shaft portions, and said shaft portions also defining second cooperating engagement means for transmitting torque therebetween in a second sense opposite said first sense and resulting in a proportionate axial separation force between said shaft portions, frangible tensile bar means extending between said pair of shaft portions for retaining the latter in a first cooperative position in opposition to said axial separating force wherein said shaft portions are not relatively rotatable, said tensile bar member fracturing in response to a determined torque of said second sense to permit axial separation of said shaft portions to a second position wherein said cooperating means do not engage and said shaft portions are relatively rotatable.

9. The invention of claim 8 wherein said shaft portions cooperatively define an axially extending through bore, said tensile bar member being disposed in said through bore.

10. The invention of claim 9 wherein said through bore is stepped, each of said shaft portions defining one of a pair of axially oppositely disposed steps on said bore.

11. The invention of claim 10 wherein said tensile bar member defines a pair of axially confronting shoulder abutment surfaces, said pair of shoulder abutment surfaces being respectively engageable each with one of said pair of steps on said bore.

12. The invention of claim 11 further including resilient means extending axially between said tensile bar member and one of said shaft portions, thereby to bias said shaft portions axially together.

13. The invention of claim 9 further including an axially elongate sleeve member disposed in said bore and circumscribing said tensile bar member, said sleeve member being relatively immovable relative to one of said shaft portions and extending rotatably and axially-slidably into said other shaft portion.

14. The invention of claim 13 wherein said other shaft portion includes blocking means cooperating with said sleeve member in said second position of said shaft members to inhibit movement thereof to said first position.

15. The invention of claim 14 wherein said other shaft portion defines a circumferential groove in said first position of said shaft portions circumscribing said sleeve member, said blocking means including a radially resilient ring member trapped in said groove in said first position of said shaft portions, and an end edge of said sleeve member moving axially past said groove in said second position of said shaft portions to free said ring member, said freed ring member moving partially into said bore to be engaged by said sleeve member end edge.

16. An air turbine starter including a decoupler shaft transmitting power therefrom to a combustion turbine engine while substantially preventing power transmission in the opposite direction, said decoupler shaft including a pair of coaxial axially adjacent shaft portions, said shaft portions defining first cooperating engagement means for transmitting torque therebetween in a first sense substantially without resulting axial force between said shaft portions, and said shaft portions also defining second cooperating engagement means for transmitting torque therebetween in a second sense opposite said first sense and resulting in as proportionate axial separation force between said shaft portions, frangible tensile bar means extending between said pair of shaft portions for retaining the latter in a first cooperative position in opposition to said axial separating force wherein said shaft portions are not relatively rotatable, said tensile bar member fracturing in response to a determined torque of said second sense to permit axial separation of said shaft portions to a second position wherein said cooperating means do not engage and said shaft portions are relatively rotatable.

17. The invention of claim 16 wherein said shaft portions cooperatively define an axially extending through bore, said tensile bar member being disposed in said through bore.

18. The invention of claim 17 wherein said through bore is stepped, each of said shaft portions defining one of a pair of axially oppositely disposed steps on said bore.

19. The invention of claim 18 wherein said tensile bar member defines a pair of axially confronting shoulder abutment surfaces, said pair of shoulder abutment surfaces being respectively engageable each with one of said pair of steps on said bore.

20. The invention of claim 19 further including an axially elongate sleeve member disposed in said bore and circumscribing said tensile bar member, said sleeve member being relatively immovable relative to one of said shaft portions and extending rotatably and axially-slidably into said other shaft portion.

* * * * *